（12）United States Patent
Xiang et al.

(10) Patent No.: US 10,639,573 B2
(45) Date of Patent: May 5, 2020

(54) MULTI-TUBE PARALLEL FREE ROTARY THREAD DEMISTING DEVICE

(71) Applicant: WUHAN UNIVERSITY OF SCIENCE AND TECHNOLOGY, Wuhan, Hubei (CN)

(72) Inventors: Xiaodong Xiang, Hubei (CN); Yimin Zhang, Hubei (CN); Jie Zhong, Hubei (CN); Ge Shi, Hubei (CN); Yizhong Yuan, Hubei (CN); Nan'nan Xue, Hubei (CN)

(73) Assignee: WUHAN UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 262 days.

(21) Appl. No.: 15/974,539

(22) Filed: May 8, 2018

(65) Prior Publication Data

US 2019/0176073 A1 Jun. 13, 2019

(30) Foreign Application Priority Data

Dec. 7, 2017 (CN) .......................... 2017 1 1335469

(51) Int. Cl.
*B01D 53/78* (2006.01)
*B01D 45/14* (2006.01)
*B01D 45/04* (2006.01)
*B01D 53/50* (2006.01)
*B01D 53/56* (2006.01)
*B01D 53/26* (2006.01)

(52) U.S. Cl.
CPC ............. *B01D 45/14* (2013.01); *B01D 45/04* (2013.01); *B01D 53/78* (2013.01); *B01D 53/266* (2013.01); *B01D 53/50* (2013.01); *B01D 53/56* (2013.01); *B01D 2258/0283* (2013.01)

(58) Field of Classification Search
CPC ......... B01D 45/14; B01D 53/78; B01D 45/04
See application file for complete search history.

(56) References Cited

FOREIGN PATENT DOCUMENTS

CN 207102249 U * 3/2018 ............. B01D 53/18

* cited by examiner

*Primary Examiner* — Robert A Hopkins
(74) *Attorney, Agent, or Firm* — Craft Chu PLLC; Andrew W. Chu

(57) ABSTRACT

The multi-tube parallel free rotary thread demisting device includes a soot pit, a side liquid guide plate, liquid accumulation units, free rotary thread units, a fixing support, a flue gas inlet, motor connecting shafts, motors, a casing, a flue gas outlet, and a base support. A main body of the device includes a plurality of free rotary thread units and a plurality of liquid accumulation units that are mounted in parallel. The motors are mounted on an outer wall of the casing. The free rotary thread units are connected to the motors via the motor connecting shafts respectively. The motor connecting shafts are fixed via the fixing support. The device has low resistance, high efficiency, and high flue gas treatment throughput, and can avoid scaling and jamming.

6 Claims, 5 Drawing Sheets

A-A

A-A

B-C

MULTI-TUBE PARALLEL FREE ROTARY THREAD DEMISTING DEVICE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the flue gas demisting field, in particular to a demisting device after wet desulphurization and denitrification, and wet dedusting.

2. Description of Related Art Including Information Disclosed Under 37 CFR 1.97 and 37 CFR 1.98

In metallurgical, thermal power generation, building material, and chemical industries, large quantities of sulfur dioxide, nitrogen oxides, and flue gas and dust are produced and cause atmospheric pollution, when fossil fuels, such as coal, petroleum, and natural gas, etc. are used. Wet desulphurization and denitrification and wet dedusting is one of the major measures for controlling emission of industrial flue gas and dust. However, when the flue gas is wet-purified, a large quantity of white gas plume and secondary particulate pollutants are produced. Therefore, developing energy-saving and efficient demisters is of far reaching importance for deep purification of wet flue gas after wet desulphurization and denitrification, and wet dedusting.

At present, industrial demisters can be categorized into baffle plate demisters and corrugated plate demisters by blade shape, or can be categorized into tubular demisters, plate demisters, and ridge demisters by layout. As people pay more and more attention to environmental problems and the industrial emission standards become more and more stringent in China, it is difficult for conventional demisters to meet increasingly stringent emission specifications.

To realize demisting of flue gas treated after wet desulphurization and reduce pollutions such as "gypsum rain", etc., Kongzhou Chu et al. has disclosed a patented "Dedusting and Demisting Device" (CN201520386813.9), which utilizes water bath and baffle for dedusting and demisting, can effectively realize trapping and humidification of dust particles in the off gasses from plants, and can recover water vapor. The device attains certain dedusting and demisting effect, but is not efficient enough, and its effect strongly depends on the flow rate and properties of the flue gas. Haitao Xu, et al. has disclosed a "Tube Bundle Dedusting and Demisting Device with Liquid Collection Unit" (CN201710020163.X), which utilizes multi-stage water mist and swirl flow assemblies in a tube bundle for dedusting and demisting. The device has high dedusting and demisting efficiency and low resistance, but still requires introduction of clean water mist for dedusting, the drain tube involves a jamming and scaling problem, and thereby the demisting effect is limited. In addition to those demisters, wet-type electrostatic demisters are believed as a type of demisters that have the highest demisting efficiency, but wet-type electrostatic demisters have drawbacks such as large size, high operation cost, and corrosion and scaling problems, etc.

Xiaodong Xiang, et al. has disclosed a patented "Cocurrent Type Coiling-Free Cycloid Demisting Device" (CN201410744558.0), which utilizes flexible fiber cycloids for demisting. The device has advantages including small size, low resistance, and high efficiency, and can be connected to flues at different inclinations. However, for the large quantity of flue gas produced in the industry, the device has drawbacks including high motor load and limited treatment capacity, etc.

In summary, there is a need for a demisting device for purifying wet flue gas, which has high efficiency, low cost, and high treatment throughput, and can avoid scaling and jamming.

BRIEF SUMMARY OF THE INVENTION

To overcome the technical drawbacks in the prior art, the present invention provides a demisting device, which has high demisting efficiency, requires low capital cost, and has high flue gas treatment throughput. The device mainly employs a multi-tube parallel structure that incorporates free rotary thread units and liquid accumulation units, and is applicable to efficient demisting of a large quantity of flue gas after the flue gas is purified through a wet process.

To attain the object described above, the device provided in the present invention mainly comprises a soot pit, a side liquid guide plate, liquid accumulation units, free rotary thread units, a fixing support, a flue gas inlet, motor connecting shafts, motors, a flue gas outlet, and a base support, etc.

The motors are fixedly mounted on the top of the device and configured to provided power for the free rotary threads to rotate; the motor connecting shafts connect the motors and the free rotary thread units, and are fixed via the fixing support in the device; the plurality of free rotary thread units and the plurality of liquid accumulation units are mounted in parallel in the device; each free rotary thread unit is disposed in a liquid guide cylinder of the liquid accumulation unit, one end of the liquid guide cylinder is connected to the fixing support, and the other end of the liquid guide cylinder is mounted on a liquid accumulation plate, the liquid accumulation plate at the bottom is provided with annular protrusions and overflow pores, and the other end of the liquid accumulation plate is connected to the side liquid guide plate; the soot pit is mounted at the bottom end of the side liquid guide plate.

Each of the free rotary thread units comprises free rotary threads, an anti-coiling structure, and a rotary thread mounting disc, etc.; the free rotary threads are mounted on the rotary thread mounting disc in central symmetry, the rotary thread material is water absorbing fibers, the rotary thread length is smaller than the inner diameter of the liquid guide cylinder by 10~20 mm, the diameter of each rotary thread is 4~6 mm, and altogether 80~120 rotary threads are provided; the rotary thread mounting disc is connected to the motor via the motor connecting shaft.

Each of the liquid accumulation units comprises a liquid guide cylinder and a liquid accumulation plate; the liquid guide cylinder is mounted on the liquid accumulation plate, and the other end of the liquid guide cylinder is fixed by the fixing support, the liquid guide cylinder is in diameter of 470~490 mm, liquid drain pores are arranged in the bottom of the cylinder in central symmetry, the liquid drain pores are in height of 100~120 mm, and altogether 4~6 liquid drain pores are provided; annular protrusions and overflow pores are evenly distributed on the liquid accumulation plate, the annular protrusions are in height of 140~160 mm, and the annular protrusions and the overflow pores have 440~460 mm inner diameter.

The free rotary threads are pendent naturally under gravity action before the device is started; the flexible fiber rotary threads spread in an umbrella form under centrifugal action when the device operates; under the action of the gas flow, the relative speed of the high-speed rotating fiber rotary threads in relation to dust-carrying droplets may be as high as tens or even hundreds of meters per second; the rotary thread material is water absorbing fibers, the droplets on the rotary thread surfaces can infiltrate into the fibers owing to capillarity as the fibers collide and contact with the water mist, to prevent the passing droplets from broken up or prevent the captured droplet from falling again; in addition, under centrifugal separation action, the dust-carrying droplets are thrown along the fiber rotary threads to the inner wall of the liquid guide cylinder in the device, and thereby gas liquid separation is realized.

In use, the device is connected between a desulphurization system and a flue gas stack, and then the motors are started, so that the free rotary threads rotate at a high speed. The desulphurized flue gas in the system enters into the demisting device through the flue gas inlet. As the flue gas passes through the free rotary thread unit, the particles and droplets in the flue gas are intercepted and trapped, the dust-carrying droplets flow along the inner wall of the liquid guide cylinder and accumulate at the liquid accumulation plate at the bottom under the action of gas flow and gravity, and finally flow through the side liquid guide plate into the soot pit at the bottom; the purified flue gas flow through the annular protrusions and overflow pores on the liquid accumulation unit and then is exhausted through the flue gas outlet; thus, a demisting effect is attained.

The device provided in the present invention employs a plurality of free rotary thread units arranged in parallel, so as to meet the requirement for treating a large quantity of flue gas at a high flow rate in the industry; in the device provided in the present invention, the motors are mounted externally, to facilitate heat dissipation from the motors in long-time operation, improve the stability and reliability of the device, and facilitate service and maintenance; since the motors and the free rotary thread units are connected via motor connecting shafts respectively and the motor connecting shafts are fixed via the fixing support, the device can operate steadily while the rotating power is transferred in the structure;

the liquid accumulation units can effectively collect the dust-carrying droplets trapped by the free rotary thread units, and the water mist and particles finally accumulate in the soot pit at the bottom through the side liquid guide plate under the action of gravity and gas flow and then are discharged.

With the technical scheme described above, the device provided in the present invention has the following advantages over the prior art:

1. The device provided in the present invention employs a plurality of free rotary thread unit arranged in parallel to overcome the drawback of low treatment throughput and high load of a single rotary thread unit, and thereby can meet the requirement for treating a large quantity of flue gas in the industry;

2. In the device provided in the present invention, the motors are mounted externally, to facilitate heat dissipation from the motors and ease service and maintenance;

3. In the device provided in the present invention, the motors are connected to the free rotary thread units via motor connecting shafts respectively, and the motor connecting shafts are fixed via the fixing support; thus, the device can operate steadily while the rotating power is transferred.

Therefore, the device provided in the present invention has advantages including low resistance, high efficiency, and high flue gas treatment throughput, and can avoid scaling and jamming, etc., can be widely applied to deep purification of white flue gas after wet desulphurization and denitrification, and wet dedusting.

DETAILED DESCRIPTION OF THE INVENTION

Hereunder the present invention will be further detailed in embodiments with reference to the accompanying drawings, but the protection scope of the present invention is not limited to those embodiments.

Embodiment 1

Figure 1:
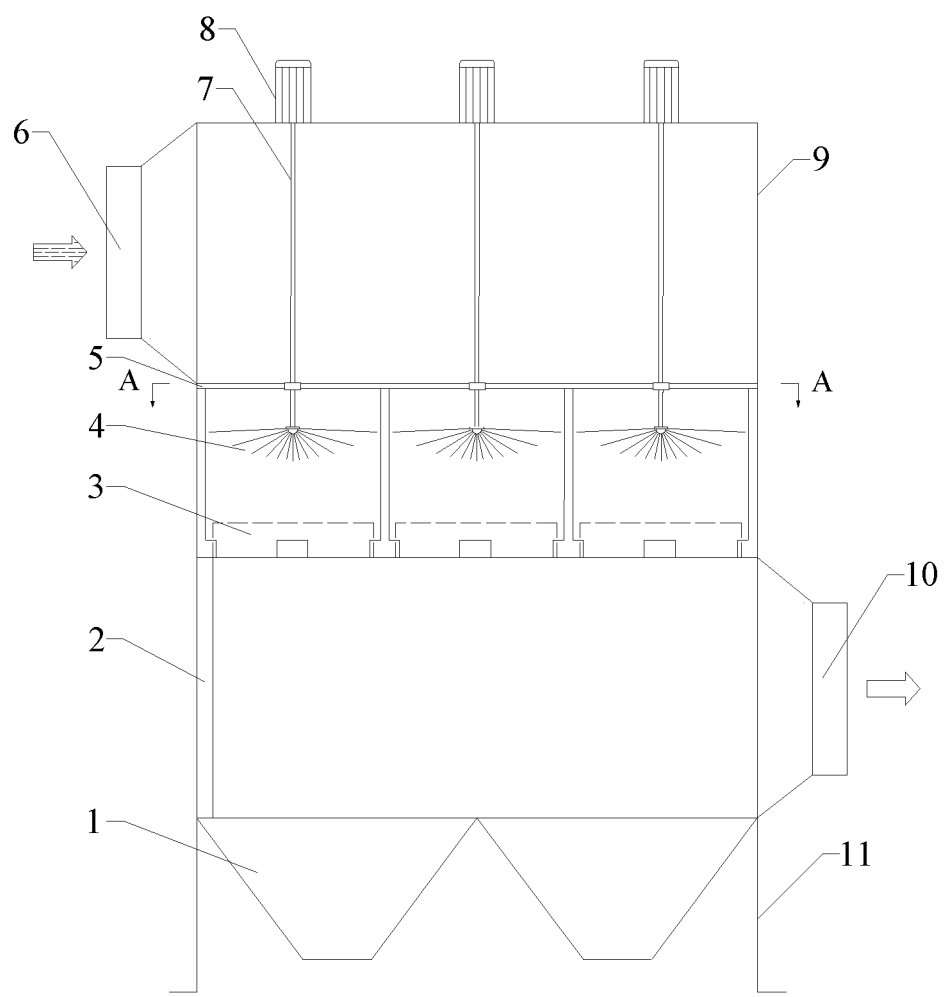
FIG. 1 is a schematic view of a diagram of a structure of the device according to the present invention.

The present invention provides a multi-tube parallel free rotary thread demisting device. As shown in FIG. 1, the demisting device comprises a soot pit 1, a side liquid guide plate 2, liquid accumulation units 3, free rotary thread units 4, a fixing support 5, a flue gas inlet 6, motor connecting shafts 7, motors 8, a casing 9, a flue gas outlet 10, and a base support 11.

As shown in FIG. 1, the flue gas inlet 6 is connected to flue gas supply from an external desulfurization tower, the motors 8 are mounted outside the casing 9 and are connected to the free rotary thread units 4 via the motor connecting shafts 7 respectively, and the motor connecting shafts 7 are fixed by the fixing support 5; the liquid accumulation units 3 are disposed below the corresponding free rotary thread units 4, the top end of each liquid accumulation unit 3 is connected to the fixing support 5, and the bottom end of the liquid accumulation unit 3 is connected to the casing 9 and the side liquid guide plate 2; one end of the side liquid guide plate 2 is connected to the liquid accumulation units 3, and the other end of the side liquid guide plate 2 is connected to the soot pit 1; the flue gas outlet 10 is connected to the inlet of an external flue gas stack, and the bottom of the device is supported by the base support 11.

Figure 2:
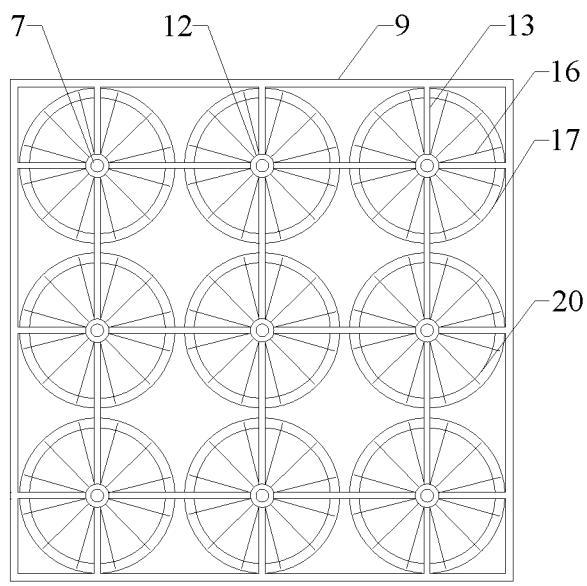
FIG. 2 is a sectional view A-A of the structure shown in FIG. 1.

As shown in FIGS. 1 and 2, the free rotary thread units 4 are evenly distributed inside the device, the plurality of free rotary thread units 4 and the plurality of liquid accumulation units 3 are mounted in parallel, the fixing support 5 is connected to the cylinder of each liquid accumulation unit 3 and is fixedly mounted inside the device, and consists of bearings 12 and metal rods 13, the bearings 12 are connected and fixedly via the metal rods 13, and the motor connecting shafts 7 pass through the centers of the bearings 12 so that they are fixed.

Figure 3:
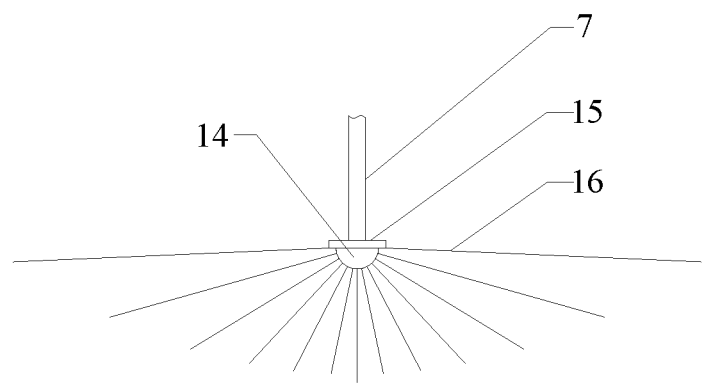
FIG. 3 is a schematic view of a structural diagram of the free rotary thread unit 4 shown in FIG. 1.
Figure 4:
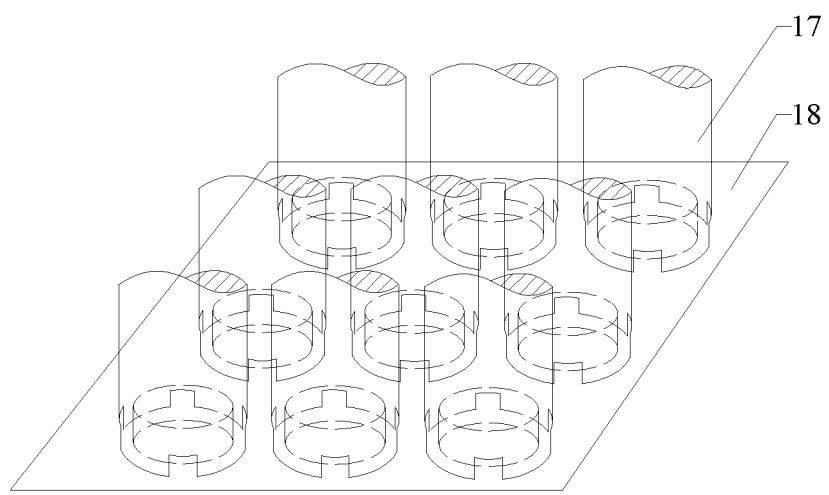
FIG. 4 is a schematic view of a structural diagram of the liquid accumulation unit 3 shown in FIG. 1.
Figure 5:
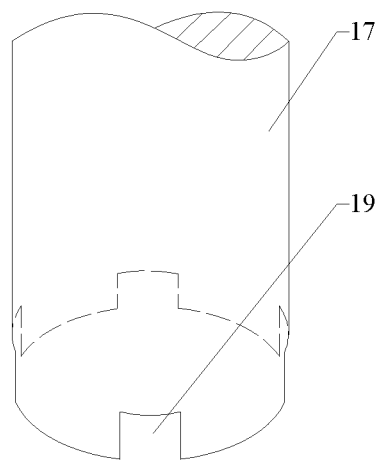
FIG. 5 is a schematic view of a structural diagram of the liquid guide cylinder 17 shown in FIG. 4.
Figure 6:
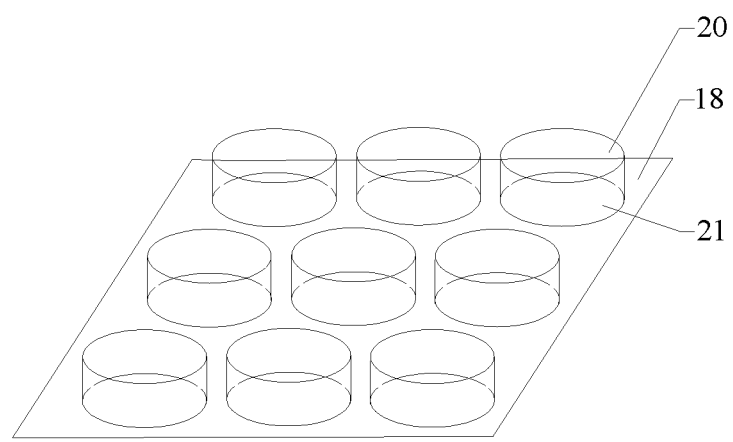
FIG. 6 is a schematic view of a structural diagram of the liquid accumulation plate 18 shown in FIG. 4.

As shown in FIGS. 1 and 3, each of the free rotary thread units 4 comprises an anti-coiling structure 14, a rotary thread mounting disc 15, and free rotary threads 16; the free rotary threads 16 are mounted on the rotary thread mounting disc 15 in central symmetry, the rotary thread material is water absorbing fibers, the rotary thread length is smaller than the inner diameter of the cylinder of the liquid accumulation unit 3 by 10~20 mm, the diameter of each free rotary thread 16 is 4~5 m, and altogether 80~120 rotary threads are provided; the rotary thread mounting disc 15 is connected to the motor 8 via the motor connecting shaft 7.

As shown in FIGS. 1,4,5 and 6, the liquid accumulation units 3 comprise a plurality of liquid guide cylinders 17 and a plurality of liquid accumulation plates 18 arranged in parallel, the liquid guide cylinder 17 is mounted on the liquid accumulation plate 18, the liquid guide cylinder 17 is in diameter of 470~490 mm, liquid drain pores 19 are arranged in the bottom of the liquid guide cylinder 17 in central symmetry, the pores are in height of 100~120 mm, annular protrusions 20 and overflow pores 21 are evenly distributed on the liquid accumulation plate 18, the annular protrusions 20 are in height of 140~160 mm, and the annular protrusions 20 and the overflow pores 21 have 440~460 mm inner diameter.

In the device, all other components, such as the casing 9, liquid accumulation units 3, and soot pit 1, etc., are made of stainless steel or a metal material coated with rust-preventive coating, in thickness of 5~8 mm, except specific components.

Embodiment 2

Figure 7:
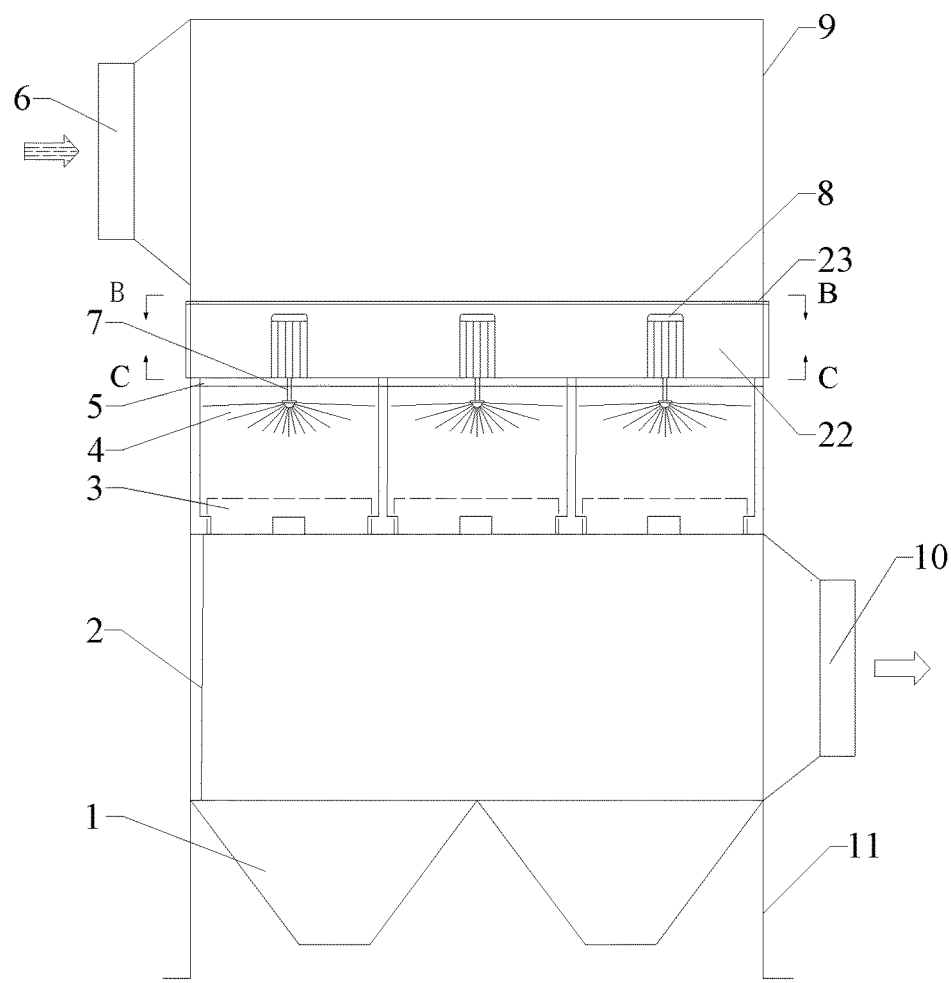
FIG. 7 is a schematic view of a diagram of another structure of the device according to the present invention.

A multi-tube parallel free rotary thread demisting device is provided. As shown in FIG. 7, the demisting device comprises a soot pit 1, a side liquid guide plate 2, liquid accumulation units 3, free rotary thread units 4, a fixing support 5, a flue gas inlet 6, motor connecting shafts 7, motors 8, a casing 9, a flue gas outlet 10, a base support 11, motor mounting holes 22, and slot-form hole covers 23. All other features of the device are the same as those in the embodiment 1, except for the following technical parameters.

As shown in FIG. 7, one end of each of the motor mounting hole 22 is connected to the flue gas inlet 6, and the other end of the motor mounting hole 22 is connected to the liquid accumulation unit 3 and the free rotary thread unit 4, the motors 8 are fixedly mounted in the motor mounting holes 22 respectively, and the fixing support 5 is disposed below the motor mounting holes 22.

Figure 8:
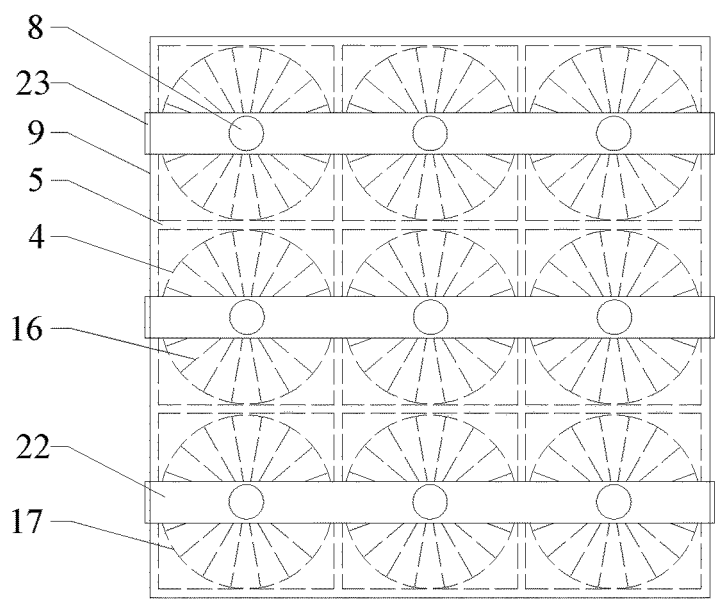
FIG. 8 is a sectional view B-B of the structure shown in FIG. 7.
Figure 9:
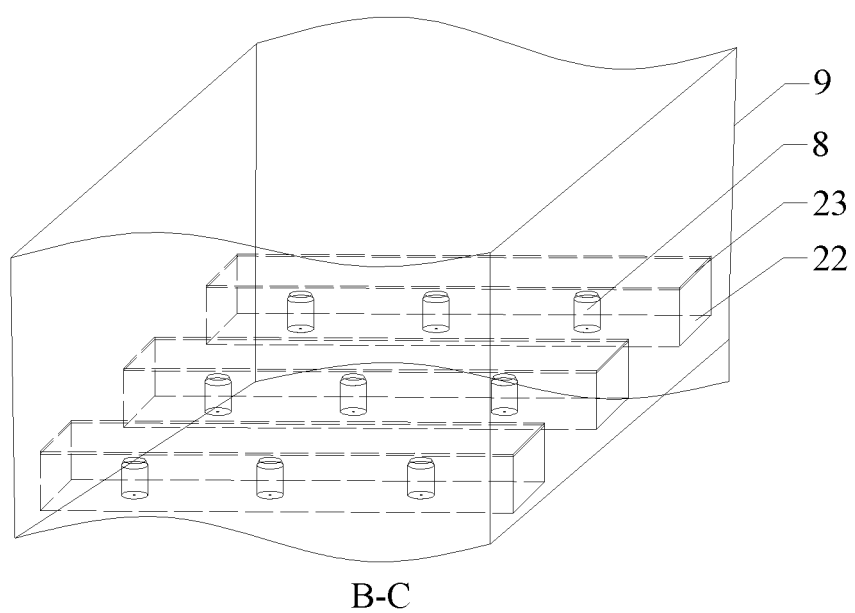
FIG. 9 is a sectional view of a structural diagram of the section B-C of the structure shown in FIG. 7.

As shown in FIGS. 7, 8 and 9, the motor mounting holes 22 are in a rectangular shape, and are evenly distributed in the middle part of the casing of the device, and altogether three motor mounting holes 22 are provided; removable slot-form hole covers 23 are provided on the motor mounting holes 22; the motors 8 are evenly distributed in the motor mounting holes 22, at 980~1020 mm spacing between each other; all other faces of the motor 8 are at 40~80 mm distance from the inner wall of the motor mounting hole 22 and the slot-form hole cover 23, except the motor shaft end of the motor 8, which is air-tight connected and mounted to the bottom of the motor mounting hole 22.

With the technical scheme described above, the device provided in the present invention has the following advantages over the prior art:

1. The device provided in the present invention employs a plurality of free rotary thread unit arranged in parallel to overcome the drawback of low treatment throughput and high load of a single rotary thread unit, and thereby can meet the requirement for treating a large quantity of flue gas in the industry;

2. In the device provided in the present invention, the motors are mounted externally, to facilitate heat dissipation from the motors and ease service and maintenance;

3. In the device provided in the present invention, the motors are connected to the free rotary thread units via motor connecting shafts respectively, and the motor connecting shafts are fixed via the fixing support; thus, the device can operate steadily while the rotating power is transferred.

Therefore, the device provided in the present invention has advantages including low resistance, high efficiency, and high flue gas treatment throughput, and can avoid scaling and jamming, etc., can be widely applied to deep purification of white flue gas after wet desulphurization and denitrification, and wet dedusting.

We claim:

1. A multi-tube parallel free rotary thread demisting device, comprising a soot pit, a side liquid guide plate, liquid accumulation units, free rotary thread units, a fixing support, a flue gas inlet, motor connecting shafts, motors, a casing, a flue gas outlet, and a base support,
wherein said flue gas inlet is connected to one end of the casing,
wherein the motors, the motor connecting shafts, the fixing support, the free rotary thread units, the liquid accumulation unit, the side liquid guide plate, and the soot pit are mounted in the casing sequentially from top to bottom, being supported by the base support, and
wherein the other end of the casing is connected to the flue gas outlet.

2. The multi-tube parallel free rotary thread demisting device according to claim 1, further comprising a plurality of free rotary thread units and a plurality of liquid accumulation units connected in parallel.

3. The multi-tube parallel free rotary thread demisting device according to claim 1, wherein each free rotary thread unit comprises an anti-coiling structure, a rotary thread mounting disc, and free rotary threads, wherein the free rotary threads are mounted on the rotary thread mounting disc in central symmetry, wherein the rotary thread material is water absorbing fibers, wherein the rotary thread length is smaller than the inner diameter of a liquid guide cylinder by 10~20 mm, wherein the diameter of each rotary thread is 4~6 mm, wherein, altogether there are 80~120 rotary threads provided, and wherein said rotary thread mounting disc is connected to the motor via the motor connecting shaft.

4. The multi-tube parallel free rotary thread demisting device according to claim 1, wherein each liquid accumulation unit comprises a liquid guide cylinder and a liquid accumulation plate, wherein the liquid guide cylinder is mounted on the liquid accumulation plate, wherein the other end of the liquid guide cylinder is fixed by the fixing support, wherein the liquid guide cylinder is in diameter of 470~490 mm, wherein liquid drain pores are arranged in the bottom of the liquid guide cylinder in central symmetry, wherein the liquid drain pores are in height of 100~120 mm, wherein there are 4~6 liquid drain pores provided, wherein annular protrusions and overflow pores are evenly distributed on the liquid accumulation plate, wherein the annular protrusions are in height of 140~160 mm, and wherein the annular protrusions and the overflow pores have 440~460 mm inner diameter.

5. The multi-tube parallel free rotary thread demisting device according to claim 1, wherein said free rotary thread unit is connected to the motor via the motor connecting shaft, and wherein the motor connecting shaft is fixed via the fixing support.

6. The multi-tube parallel free rotary thread demisting device according to claim 1, wherein said motor is mounted on an outer wall of the casing.

* * * * *